Sept. 14, 1943.  B. DE H. MILLER  2,329,288
MOLDING OF MATERIALS
Filed Dec. 17, 1940   3 Sheets-Sheet 1
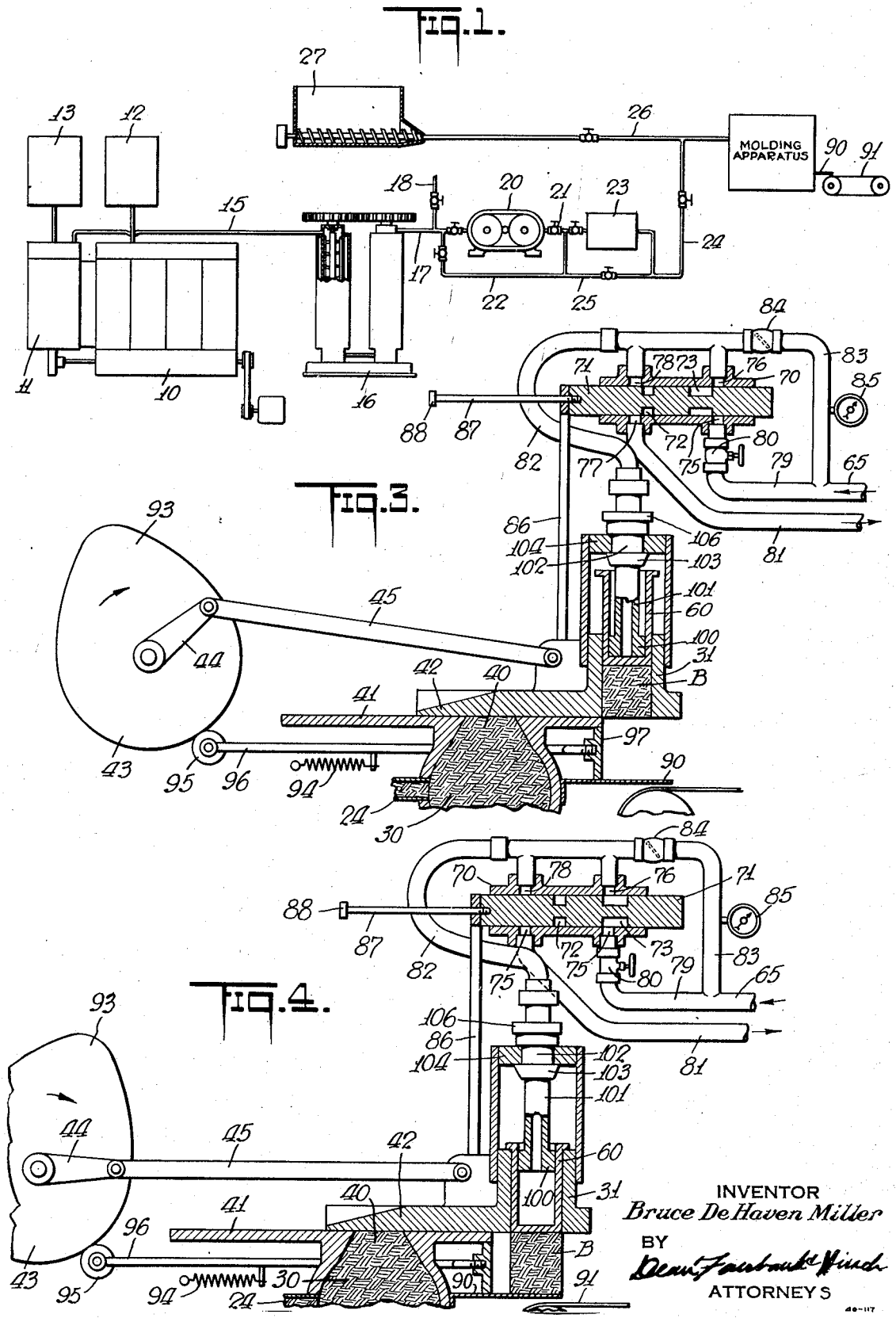
INVENTOR
*Bruce De Haven Miller*
BY
ATTORNEYS Sept. 14, 1943.  B. DE H. MILLER  2,329,288
MOLDING OF MATERIALS
Filed Dec. 17, 1940  3 Sheets-Sheet 2
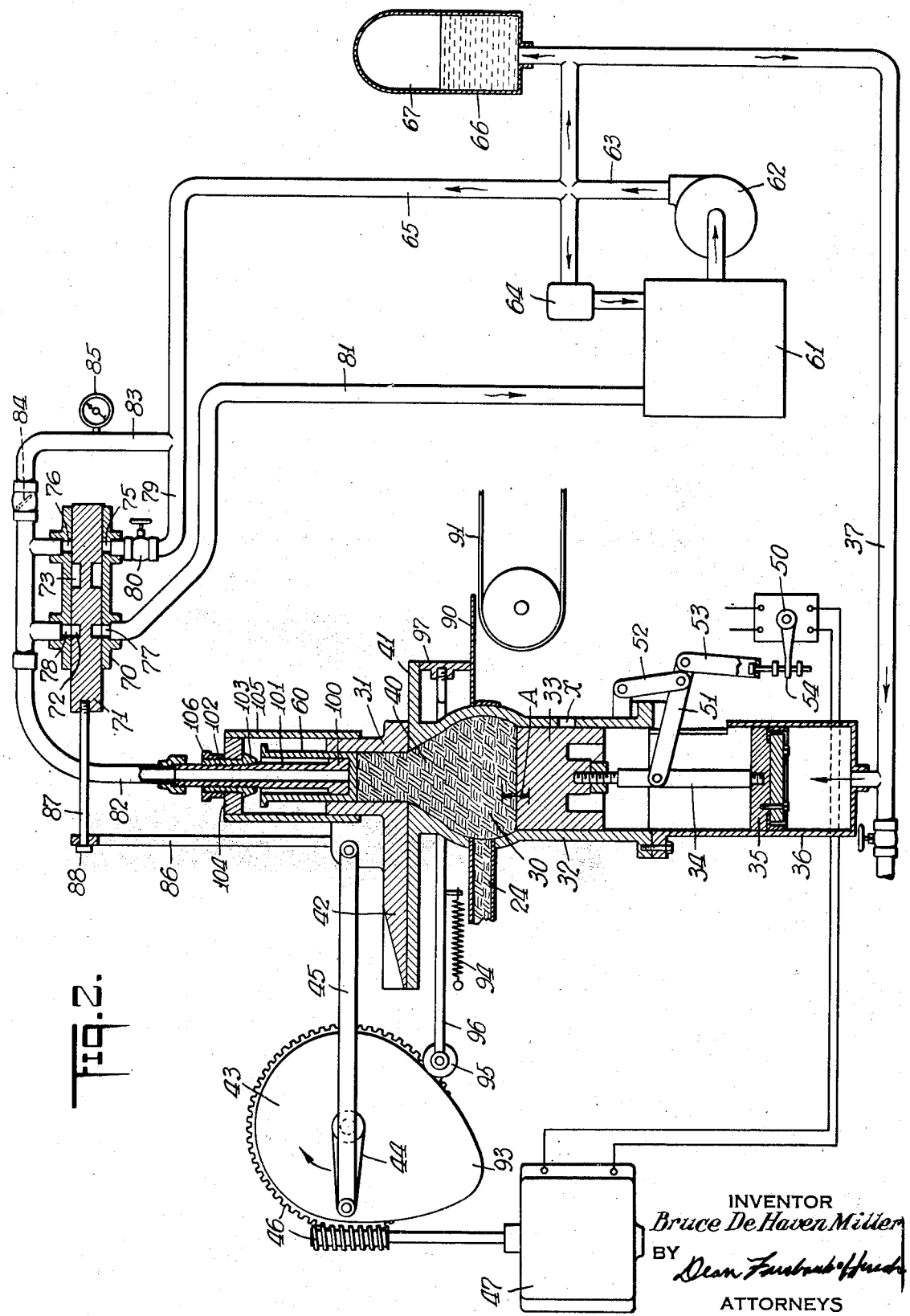
INVENTOR
*Bruce De Haven Miller*
BY
*Dean Fairbank Hirsch*
ATTORNEYS

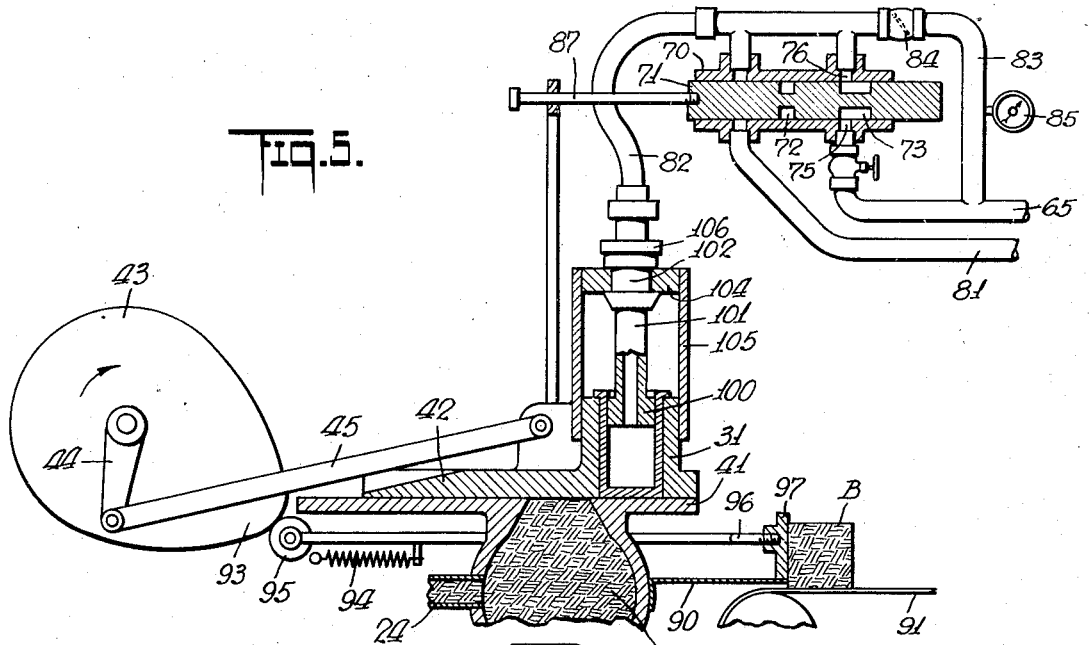
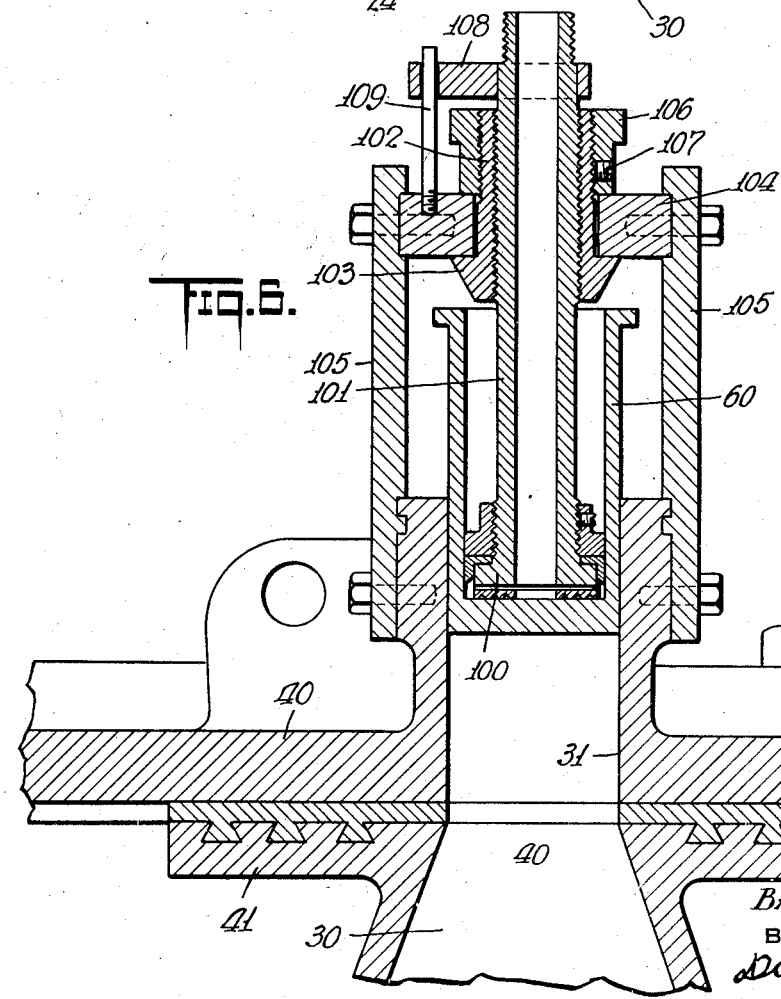

Patented Sept. 14, 1943

2,329,288

UNITED STATES PATENT OFFICE 2,329,288

MOLDING OF MATERIALS

Bruce De Haven Miller, Louisville, Ky., assignor to The Girdler Corporation, Louisville, Ky., a corporation of Delaware Application December 17, 1940, Serial No. 370,441

22 Claims. (Cl. 31—42)

This invention relates to the art of molding materials and involves a novel method and apparatus for establishing and maintaining a set of conditions under which the molding of material may be carried out at a high rate of speed and with great accuracy. In addition, it provides a new and improved combination of apparatus parts and process steps for handling moldable material, before, during and after the molding operation.

Despite the large amount of effort which has been directed toward the development and improvement of molding procedures, many problems in that art have remained unsolved. This appears to be due primarily to the necessity for subordinating the cyclic rate of molding to limitations of character of the material, the nature of the supply, the formation of the mold print or the dispensing of the molded print. As a result, a comparatively small number of prints has been produced per given period of time with known apparatus with which I am familiar, as contrasted with the results obtained by the use of the method and apparatus herein disclosed.

In some cases this slow cyclic rate of production is due to the stopping and starting of the mold apparatus, or to the use of a separate compacting step for the molded material after it is placed in the mold space, or to the use of complex and slow moving supply means or dispensing means for the material entering and leaving the mold space. In other cases the cyclic rate of production has been impeded by the use of complex apparatus which may develop leaks, wear excessively at high speeds, cause variations in weight and size of successive molded prints, or require constant supervision during operation in order to insure a satisfactory production rate.

The present invention has as an object the provision of an improved method and means for molding materials at a high rate of production which requires little or no manual work or supervision.

Another object is the provision of a combination of apparatus for molding materials wherein the material is continuously supplied to one part of the apparatus while another part of the apparatus is continuously operating in a filling, molding and dispensing cycle.

Another object is the provision of a compact, simple apparatus having a minimum number of parts in which leakage could develop and which can be operated at high speeds without excessive wear which would produce leakage.

Another object is the provision of a mold apparatus in which material may be molded against the action of an easily adjusted pressure so that well defined prints of a desired shape and of a predetermined weight may be secured while the apparatus is operated at a high production rate.

Another object is the provision of a method and apparatus in which the production rate can be made dependent upon the rate of supply of material into the molding system. Thus, the molder may be automatically or manually speeded up or slowed down in accord with the rate of material supply, rather than being compelled to run at a substantially fixed rate.

Another object is the provision of a new and improved pressure balancing system for the expansible mold space in molding apparatus.

Another object is the provision of a new and improved means for dispensing and discharging a molded print from molding apparatus.

Another object is the provision of a molding apparatus which may be operated conveniently in conjunction with material fed under pressure from a hopper or from a continuous processing system under pressure.

The present invention also has for an object the provision of improvements in certain features of the invention disclosed and more broadly claimed in my previously filed application, Serial No. 309,143, filed December 14, 1939, which is assigned to the same assignee as the present invention.

Other objects and advantages will become more apparent or will be pointed out in connection with the following description and the accompanying drawings which show only one of many forms and arrangements of apparatus parts which may be employed in carrying out my invention.

In these drawings,

Fig. 1 is a diagrammatic showing of a processing apparatus or system in which my improved molder, also diagrammatically shown, may be incorporated;

Fig. 2 is partly diagrammatic and partly sectional view of one form of the molding apparatus, the parts being shown in the position they occupy when the movable mold is at one end of its stroke and has been filled;

Fig. 3 is a view similar to a portion of Fig. 2 showing the mold nearly to the opposite end of its stroke;

Fig. 4 is a similar view with the mold at the end of the stroke and the print discharged;

Fig. 5 is a similar view with the mold at about the middle of the return stroke; and Fig. 6 is a view similar to a portion of Fig. 2 showing the mold parts on a larger scale.

A complete system particularly useful in the manufacture of margarine, but having features applicable to the processing of soap, cheese, butter, lard, and other plastic materials, is shown somewhat diagrammatically in Fig. 1. This system comprises a pair of pumping devices 10 and 11, which force the material to be processed from supply tanks 12 and 13 continuously through the system at superatmospheric pressure, and which desirably constitute the only pressure source of the system, although suitable pressure boosters could be located at subsequent stages of the operation without departing from the scope of the invention.

In cases where the material to be processed includes a plurality of separate ingredients, the tanks 12 and 13 may serve to supply separately these ingredients, and the two pump sections 10 and 11 may function to proportion these ingredients in the desired ratios before discharge through a delivery conduit 15. Otherwise, a single supply tank and a single pump may be used.

The material is forced by the pumps 10 and 11 through the conduit 15 and into a suitable processing apparatus 16, which may be of the general type disclosed in Patent No. 2,013,025, granted September 3, 1935, to Bottoms and Wood, and which subjects the material under pressure to cooling and concurrent agitation before delivery to an outlet 17. As is obvious, suitable valves, controls and the like may be used on the apparatus handling the product before reaching the conduit 17. If additional ingredients are to be added to the material at this point, these may be delivered into the conduit 17 through a pipe 18.

The material, depending upon its nature, may pass from the conduit 17 through a mechanical blender 20 and into a conduit 21, or be by-passed around said blender through a conduit 22. Still depending upon the nature of the material being processed, this material may pass from the conduits 21 or 22 either through a retention chamber 23, in which either or both special heat exchange and mechanical working may or may not take place, and then into a conduit 24, or through a by-pass line 25 into said conduit 24.

Assuming that the material being processed is for the manufacture of soap or margarine, this material, by the time it reaches the conduit 24, will have become sufficiently plastic to enable it to be molded, severed and dispensed, and will be under sufficient pressure to enable it to flow into the molding apparatus as will be described.

So far as concerns the molding method and apparatus, the material may be delivered under pressure from various other sources. Merely as an illustration, I have shown a pipe 26 connected to the delivery pipe 24 leading to the molding apparatus and leading from a mixing apparatus or hopper with a screw for forcing the material under pressure through the pipe 26 to the molding apparatus, and if desired, for also agitating or otherwise processing the material in the chamber 27. It will be understood that ordinarily if both types of supply are provided, the valve in either the pipe 24 or the pipe 26 will be closed in normal operation.

The molding apparatus shown more in detail in Figs. 2 to 6 inclusive includes an expansible chamber 30 to which the material from the pipe 24 is continuously delivered under pressure, and from which it may flow under pressure into a mold 31 which is intermittently in and out of communication with the chamber 30. As the supply to the chamber may be continuous and as the withdrawal from the chamber is intermittent and as the plastic material is ordinarily substantially non-compressible, the chamber 30 is so designed that it retains the material under a substantially constant pressure and the capacity of said chamber may fluctuate. When the mold is out of communication with the chamber, the amount of the material in the chamber will increase and when communication between the mold and the chamber is established, the material rapidly flows from the chamber into the mold and the amount in the chamber decreases.

As an example of a chamber of variable capacity, I have shown the chamber 30 provided with a cylindrical extension 32 having therein a piston 33 which is connected by a rod 34 to a piston 35 in a hydraulic pressure cylinder 36. The space below the piston 35 may be kept filled at all times with a suitable fluid under pressure such as water supplied through a pipe 37 from a pressure source. As the piston 33 moves up and down, the piston 35 will likewise move up and down but the pressure on the material in the chamber 30 will remain substantially constant. It will be understood that the piston 33 has a comparatively short range of movement depending upon the capacity of the mold, the ordinary range of movement being indicated by the arrow A.

The chamber 30 has an outlet 40 through the wall 41 on which the mold 31 slides. This mold may be moved back and forth from one extreme position shown in Fig. 2 to the opposite extreme position shown in Fig. 4, so that in one position it is in open communication with the chamber 30 through the opening 40 and in the opposite position is beyond the end of the wall 41 so that the material in the mold may be discharged. The slide has a wall portion 42, held down against vertical movement, slidable on the wall 41 and of such length that the outlet 40 is closed at all times except when communicating with the mold 31.

Any suitable means may be employed for reciprocating the mold. Merely as an illustration, I have shown a crank disc 43 having a crank 44 connected to the mold through a link 45. The crank disc may be driven in any suitable manner as for instance, through gearing 46 from an electric motor 47.

The rate at which the material is withdrawn from the chamber by the mold and the rate at which the material is delivered to the chamber should be kept substantially the same. As the mechanism for forcing the material through the pipe 24 into the mold may be independent of the speed of the motor 47, means are provided for automatically maintaining the average amount of material in the chamber 30 substantially constant. This might be done by varying the rate of supply through the pipe 24 or varying the frequency of operation of the mold. Preferably, the latter is employed, because operating conditions may require wide variations in the rate of processing of the material. As shown, means are provided for controlling the motor 47 in accordance with the amount of material in the chamber 30. A current controller 50 is provided in the electric circuit leading to the motor 47. The piston rod 34 is provided with a lever 51 pivoted on a link 52 and connected through a link 53 to the operating arm 54 of the controller 50.

Lost motion connections are provided between the link 53 and the arm 54 and permitting the normal fluctuations of the piston in successive fillings of the mold and without moving the arm 54. If the amount of material in the chamber 30 decreases below a predetermined limit and the piston 33 rises above a predetermined position, the arm 54 will be raised to stop or slow down the motor. On the other hand, when the amount of material in the chamber 30 exceeds a predetermined amount and the piston 33 is forced down beyond a predetermined point, the link 53 will pull the controller arm 54 in the opposite direction and start or speed up the motor.

The controller 50 may be in the form of a rheostat for varying the amount of current to the motor, in which case the motor would operate continuously but at the proper speed, or it may be in the form of a make and break switch which will intermittently and momentarily stop the motor until the amount of material in the chamber 30 accumulates to the desired limit. In that case the normal speed of the motor might be slightly in excess of that corresponding to the rate of delivery of the material to the chamber, and the motor might be intermittently stopped when the amount of material in the chamber 30 gets below the desired limit. Although the power means is shown as an electric motor with a controller 50, obviously it might be a fluid motor and the controller 50 vary the amount of pressure fluid delivered to the motor, or the motor 47 might be an internal combustion engine and the controller 50 be the throttle thereof.

The mold 30 is provided with a piston 60 which when in its upper position defines the maximum capacity of the mold and which may be moved downwardly so that its surface is flush with the open lower side of the mold to thereby discharge the print or mold block from the mold when the latter is beyond the wall 41 and exposed to the atmosphere. It is desirable that pressure be applied to this piston during the filling of the mold so that the piston will be forced upwardly against said pressure during the filling and the material in the mold maintained under the same pressure as in the chamber 30 during the filling. Thus, the complete and perfect filling of the mold is insured.

It is also desirable that the pressure on the piston be released after the mold has been filled and that pressure on the piston be reestablished after the mold reaches discharging position so that the piston will be forced down and the print or mold unit removed from the mold.

In carrying out my invention, I preferably employ fluid pressure, the fluid being taken from the same source as that employed in the cylinder 36.

As illustrated, there is provided a liquid tank 61 and a pressure pump 62 which may continuously withdraw liquid from the tank 61 and maintain a predetermined fluid pressure in the discharge pipe 63 of the pump. To keep this pressure constant, there is provided a return pipe leading back to the tank 61 and provided with an automatic pressure control valve 64. Thus, any pressure in the pipe 63 in excess of that which it is desired to maintain will be relieved by return flow past the valve 64.

The pipe 63 is connected to the pipe 37 leading to the cylinder 36 and with a pipe 65 leading to the control valve for the piston 60 of the mold. To take care of fluctuation in the amount of liquid applied to the pistons 35 and 60, there may be provided a tank 66 with which the pipes 37, 63 and 65 communicate, and which has a sealed air dome 67. The control valve for the application and release of pressure on the piston 60 includes a valve casing 70 having a reciprocable valve member 71 provided with an annular passage 72 and a separate annular passage 73. The valve casing 70 has two opposed ports 75 and 76 and another pair of opposed ports 77 and 78. The port 75 is connected to the pipe 65 through a branch 79 having a shut off valve 80, the port 77 is connected to the tank 61 by a return pipe 81, and the pipe 82 leading to the piston 60 has a branch leading to the port 78, a separate branch leading to the port 76 and a branch 83 leading to the pipe 65 and containing a check valve 84 and a pressure gauge 85.

The pipe 82 leading to the piston 60 is flexible so that the mold and its piston 60 may move back and forth in respect to the stationary valve casing 70. The mold has an arm 86 slidable on a rod 87 connected to the valve member 71. There are lost motion connections between the parts 86 and 87 so that the valve moves only as the mold approaches one end or the other of its stroke. The lost motion connections illustrated are merely a head 88 on one end of the rod 87 and the end of the valve member itself so that the arm 86 when moving to the left will engage the head and pull the valve to one position, and when moving to the right may engage the end of the valve and move the latter to the other position.

With the parts in the position shown in Fig. 2, the mold is at one extreme position, the mold 31 is full and the arm 86 has just pushed the valve 71 to its extreme position and connected the ports 77 and 78 with the passage 72. Thus, the pressure in the pipe 82 and which was applied to resist upward movement of the piston 60 may escape through the port 78, passage 72, port 77 and pipe 81 to the tank 61.

As the crank disc 43 rotates clockwise from the position shown in Fig. 2 to the position shown in Fig. 3, the valve 71 will remain stationary and there will be no pressure applied to the material on the mold. When the arm 86 engages the end of the valve, it will start pushing the latter endwise and in Fig. 3, the parts are shown in the position which they occupy when the valve 71 has been moved to such a position that the passage 72 is out of communication with the pipes 82 and 81 but the passage 72 has not reached the ports 75 and 76. In this position the molded unit is part way beyond the end of the plate 41. When the crank disc 43 is rotated to push the mold entirely beyond the end of the plate 41, further movement of the mold and valve 71 will bring the passage 73 into communication with the ports 75 and 76, and liquid under pressure from the pump can flow through the pipes 65 and 79, port 75, passage 73, port 76 and pipe 82 to act on the piston and force it down to eject the molded unit as shown in Fig. 4. The lower face of the piston will then be flush with the under side of the slide 42.

Further rotation of the crank disc causes movement of mold slide 42 in the reverse direction, to the left as shown in the drawings. During such reverse movement and until the mold comes into communication with chamber 30, piston 60 is maintained in its lowermost position, shown in Fig. 5, by continued application of pressure on the piston due to the length of passage 73 and the lost motion connections of the valve mechanism. This has the important advantage that there is no opportunity for accumulation of air which later would have to be expelled from the mold cavity or might become entrapped in the molded material.

When the mold slide reaches a position somewhat to the left of that shown in Fig. 5, the mold is brought into communication with opening 40 and material starts to enter the mold under pressure from chamber 30. During further leftward movement of slide 42, the material rapidly flows into the mold and pushes the piston up against the fluid pressure. Complete filling of the mold takes place in a very short time and the material is maintained under the desired pressure during the whole of the filling operation. At a certain point in the leftward movement of slide 42 and valve 71, both passages 76 and 78 of the valve mechanism are closed off. To avoid build up of dangerous pressure in and bursting of pipe 82 under these circumstances, check valve 84 is arranged to relieve the pressure in pipe 82 against the pressure in pipe 65. Thus, proper pressure is maintained on the mold piston, while at no time does the pressure in pipe 82 exceed safe limits corresponding to the pressure in pipe 65. With final movement of the mold slide into its lefthand limiting position shown in Fig. 2, arm 86 moves valve 71 so as to connect passage 78 with passage 77 through passage 72, thereby relieving pressure on the mold piston. No pressure thereafter is applied to the piston until slide 42 reaches its extreme righthand, or discharge, position, since the lost motion connections between parts 86 and 87 prevent rightward movement of valve 71 until the slide finally moves into discharge position. Relief of pressure on the piston until the mold slide reaches discharge position has the advantage that it insures against extrusion or deformation of the molded unit prior to proper discharge of the latter. With final movement of slide 42 into its righthand limiting position, wherein the underside of the mold is completely open, valve 71 is moved as previously described so as again to effect application of pressure to the piston and thereby cause discharge of the molded unit from the mold.

The print or molded unit B when discharged from the mold preferably falls onto a support 90. From this it is later pushed off onto a moving conveyor 91. This transfer of the print from the support 90 to the conveyor 91 may be effected by mechanism operated in proper time relationship to the crank disc 43. As shown, this crank disc is in the form of a cam with a lobe 93 and a spring 94 presses a roller 95 against the periphery of the cam. The roller 95 is connected by a rod 96 to the pusher head 97. The shape of the cam is such that the pusher head normally remains beneath the plate 41 during the major portion of the operation, but after the print or unit has been discharged from the mold onto the support 90, the lobe 93 of the cam engages the roller 95 of the pusher to move the unit onto the conveyor. The pusher is then almost immediately drawn back underneath the plate 41.

In most commercial constructions, it is desirable to adjust or control the upward limiting movement of the piston 60 so as to control and accurately determine the maximum cubic capacity of the mold and thus accurately determine the exact size of the unit or print to be formed. In the construction illustrated, the piston 60 is hollow and it may be rectangular in cross section if the unit to be formed is similarly rectangular.

Disposed within the hollow piston 60 is a second piston 100 on the end of a normally stationary pipe 101 which is connected to the pipe 82. The piston 100 and the chamber within the hollow piston 60 may be cylindrical or of any other desired cross sectional shape. The piston 100 is vertically adjustable and normally rigidly secured in position so that it constitutes a stop, limiting the upward movement of the piston 60.

The securing and adjustment of the piston 100 may be effected by a sleeve 102 threaded on the pipe 101, and having a flange 103 abutting against the under side of a cross head 104 supported by brackets 105 rigidly secured to the mold. The sleeve 102 is also threaded externally, and has a nut 106 which may be screwed down to engage the upper side of the cross head 104. Loosening of this nut may be prevented by a set screw 107. When it is desired to vertically adjust the piston 100, the sleeve 102 is rotated so that it will pull up or push down the pipe 101 and the piston 100 to the desired position.

If the piston 100 and the chamber in the piston 60 be cylindrical, means are provided for preventing any rotation of the piston 100 and its pipe 101. As shown, the upper end of the pipe 101 may be held against rotation in a bracket 108 carried by the cross head 104. Such rotation may be prevented by making the upper end of the pipe 101 square or of other non-circular form, or providing it with a key sliding in a key-way in the bracket 108, or by clamping the bracket 108 on the pipe and holding it against rotation by a pin 109.

It will be obvious that various other means may be employed for fixing the upward limiting position of the piston 60 while applying yielding pressure to the latter during the filling. It is important that all pressure on the unit in the mold be released prior to the time the under side of the mold begins to open and until after it has completely opened for the discharge of the unit. Otherwise the unit might be partly extruded or deformed before the lower side of the mold is completely uncovered. The pressure is again applied when the mold side is entirely open to permit discharge of the unit without deformation.

I have illustrated a construction in which the pressure is applied to the piston by means of a fluid and this has many important advantages, but the broad principle of the invention may be embodied in a construction in which the pressure applied to the piston both during filling and during discharge of the molded unit is effected by means of a spring or a weight provided that the action of such spring or weight is prevented during the movement of the mold into and to discharge position. Otherwise, discharge would begin before the mold was completely open on the under side and a molded unit might be in part extruded and lose its desired form and shape. The piston 33 might be pressed upwardly by the action of a spring or counterbalancing weight.

I have shown the same pressure applied to the piston 33 for keeping the material under pressure in the chamber 40 as is applied to the piston 60 of the mold. Different sources of pressure might be employed, the only qualification being that the effective pressure for forcing the material into the mold exceed that resisting the upward movement of the piston of the mold. In the present construction, this is accomplished by making the outer bottom face of piston 60 substantially larger than the inner bottom face of said piston 60.

In some constructions, the sleeve 102 might be omitted and the pipe 101 threaded in the cross head so that it is adjusted endwise by rotating it. This necessitates detaching the flexible hose 82 from the pipe 101 each time the position of the piston 100 is adjusted.

The motor 47 may be employed to drive the pump 62 and the mold slide driven by a hydraulic motor operated by the fluid delivered by the pump. The speed of the hydraulic motor may be controlled by a throttle valve in the line leading from the pump to the hydraulic motor and operated by the parts 51, 52 and 53.

Various other changes in the details of the apparatus and in the specific steps of the process may be made within the scope of my invention.

Having thus described my invention, what I claim as new and desire to secure by Letters Patent is:

1. A molding apparatus including a mold, a receptacle for moldable material under pressure, means for intermittently establishing and terminating communication between said mold and said receptacle and uncovering one side of said mold to permit discharge of molded material, a hollow piston in said mold, a second piston within said first mentioned piston and in normally fixed position in respect to said mold, and means for controlling the delivery of fluid pressure through said second mentioned piston to yieldingly resist movement of said first mentioned piston in one direction during filling of the mold and to effect movement of said first mentioned piston in the opposite direction to discharge the molded material from said mold.

2. A molding apparatus including a receptacle for moldable material under pressure, means providing a mold cavity having an open side, a piston movable in said mold cavity, a structure movable to one position to effect communication between said receptacle and said open side of the mold cavity, said structure being movable to another position to terminate such communication and uncover said open side of the mold cavity, and means operative to apply fluid pressure to said piston so as yieldingly to resist filling of the mold cavity when the latter is in communication with said receptacle and operative to apply fluid pressure to said piston so as to discharge a molded unit from the mold cavity when said movable structure is in its said other position.

3. A molding apparatus including a receptacle for moldable material under pressure, means providing a mold cavity having an open side, a piston movable in said mold cavity, a structure movable to one position to effect communication between said receptacle and said open side of the mold cavity, said structure being movable to another position to terminate such communication and uncover said open side of the mold cavity, means operative to apply fluid pressure to said piston so as yieldingly to resist filling of said mold cavity when said movable structure is in its said one position, means operative to relieve said pressure on the piston during movement of said structure to its said other position, and means operative to re-apply fluid pressure to said piston to discharge a molded unit from said mold cavity when said structure is in its said other position.

4. A molding apparatus including a receptacle for moldable material under pressure, means providing a mold cavity having an open side, a piston movable in said mold cavity, a structure movable to one position to effect communication between said receptacle and said open side of the mold cavity, said structure being movable to another position to terminate such communication and uncover said open side of the mold cavity, and means operative to apply fluid pressure to said piston so as to discharge a molded unit from said cavity when said movable structure is in its said other position, operative to maintain pressure on said piston during movement of said structure from its said other position into its said one position and during filling of said cavity, and operative to relieve said pressure after said cavity is filled and during movement of said structure from its said one position into its said other position.

5. A molding apparatus including a receptacle for moldable material under pressure, a support having a discharge outlet from said receptacle, a reciprocating slide on said support and including a mold movable into and out of a position for receiving material from said outlet, a piston in said mold, a source of fluid under pressure, and valve means for controlling the application of said fluid to said piston to yieldingly resist the movement of said piston during filling of said mold when the latter is in communication with said outlet, and for applying pressure to said piston to discharge the molded unit from said mold when said mold is out of communication with said outlet.

6. A molding apparatus including a receptacle for moldable material under pressure, a support having a discharge outlet from said receptacle, a reciprocating slide on said support and including a mold movable into and out of a position for receiving material from said outlet, a piston in said mold, a source of fluid under pressure, and valve means for controlling the application of said fluid to said piston to yieldingly resist the movement of said piston during filling of said mold when the latter is in communication with said outlet, releasing fluid pressure on said piston while said mold is moving into discharging position, and applying fluid pressure to said piston when said mold is in discharging position.

7. A molding apparatus including a receptacle for moldable material under pressure, a mold, means for moving said mold into and out of communication with said receptacle and into and out of discharging position, a piston in said mold, a valve for controlling the application of fluid pressure to said piston, and means including a lost motion mechanical connection between a movable part of said valve and said mold for operating said valve dependently upon and in timed relationship with the movement of said mold.

8. A molding apparatus including a receptacle for moldable material under pressure, a mold, means for moving said mold into and out of communication with said receptacle and into and out of discharging position, a piston in said mold, valve means for controlling the application of fluid pressure to said piston, and means for operating said valve means in timed relationship to the movement of the mold to maintain pressure on said piston during the filling of the mold and when the mold is in discharging position, and to relieve pressure on said piston during the movement of said mold into discharging position.

9. A molding apparatus including a receptacle for moldable material under pressure, a mold, means for moving said mold into and out of communication with said receptacle and into and out of discharging position, a piston in said mold, means for applying a predetermined substantially constant yielding pressure to said piston to resist but permit the filling of said mold, means for relieving said pressure on said piston during movement of the mold into discharging position, and means for moving said piston in said mold to discharge the molded unit when in discharging position.

10. A molding apparatus including a receptacle for moldable material under pressure, a mold, means for moving said mold into and out of communication with said receptacle and into and out of discharging position, a piston in said mold, and means for applying pressure to said piston when the mold is in discharging position, maintaining said pressure during the major portion of the movement of the mold into communication with said receptacle and during the filling of the mold, and relieving pressure on said piston after the mold is filled and during the movement of the mold into discharging position.

11. A molding apparatus including a receptacle having an inlet for continuous supply of moldable material thereto under pressure and having means operable to afford automatic variation in the effective size of said receptacle in response to fluctuations in the volume of material therein, means providing a mold cyclically movable into and out of a position for receiving material under pressure from said receptacle, and means operative to maintain material in said receptacle under predetermined substantially constant pressure.

12. An apparatus for molding plastic material including a chamber of variable capacity, a mold, means for moving said mold cyclically into and out of communication with said chamber and into and out of discharging position, means for applying pressure to the material to effect continuous flow of the material under pressure into said chamber and intermittently from said chamber into said mold to fill the latter, and means operative automatically for varying the frequency of the cycles of movement of the mold to thereby maintain the amount of material in said chamber within predetermined limits.

13. An apparatus for molding plastic material including a chamber of variable capacity, a mold, means for moving said mold cyclically into and out of communication with said chamber and into and out of discharging position, means for applying pressure to the material to effect continuous flow of the material under pressure into said chamber and intermittently from said chamber into said mold to fill the latter, and means controlled in accordance with the volume of material in said chamber for controlling the time cycle of movement of the mold.

14. A molding apparatus including a receptacle having an inlet for continuous supply of moldable material thereto under pressure and having means operable to afford automatic variation in the effective size of said receptacle in response to fluctuations in the volume of material therein, a movable mold, means operable to effect movement of said mold cyclically into and out of communication with said receptacle, and means operative to render the operation of said last-mentioned means dependent upon the volume of material in said receptacle.

15. An apparatus for molding plastic material continuously into units of predetermined size and shape, including a control chamber having means providing for the continuous delivery of material thereto under pressure and having a wall movable to afford automatic variation in the size of the chamber in accordance with fluctuations in the volume of material in the chamber, a mold, means for moving said mold cyclically into and out of a position for receiving material under pressure from said chamber and into and out of a position for discharge of molded units from the mold, and means operative automatically to control the time cycle of movement of said mold in accordance with the position of said wall.

16. An apparatus for molding plastic material into units of predetermined size and shape including a receptacle for plastic material, a slide having a mold, means for moving said slide back and forth to bring said mold into and out of communication with said receptacle and into and out of discharging position, a piston in said mold, valve means for controlling the application of fluid pressure to said piston, and mechanical connections between said slide and a movable part of said valve means for rendering the operation of said valve means dependent upon the position of said slide.

17. A molding apparatus including a chamber having an inlet for the continuous delivery of moldable material thereto under pressure and having means operable to afford automatic variation in the effective size of the chamber in response to fluctuations in the volume of material in the chamber, a mold having a piston movable therein, means for cyclically establishing communication between said chamber and said mold so as to permit flow of material into the mold under pressure from the chamber, and for cyclically terminating such communication, a source of substantially constant fluid pressure, and means for applying said fluid pressure to said first-mentioned means and to said piston so an to maintain the material in said chamber and said mold under substantially constant pressure during filling of the mold.

18. A molding apparatus including a chamber having an inlet for the continuous delivery of material thereto under pressure and having a wall portion movable to afford automatic variation in the effective size of said chamber in response to fluctuations in the volume of material in the chamber, a mold having a piston movable therein, means for effecting movement of said mold cyclically into and out of communication with said chamber and into and out of mold discharging position, means for applying fluid pressure to said wall portion so as to maintain material in said chamber under substantially constant pressure, and means for applying substantially constant fluid pressure to said piston during filling of said mold so yieldingly to resist flow of material into the mold from said chamber.

19. An apparatus for molding plastic material including a chamber having a movable wall, means for continuously supplying plastic material under pressure to said chamber, a mold, means for moving said mold intermittently into and out of communication with said chamber and intermittently into and out of discharging position, a piston in said mold, a source of fluid pressure, means for applying said fluid pressure to said movable wall and to said piston, and means controlled by the position of said wall for varying the frequency of the cyclic movements of said mold.

20. An apparatus for molding plastic material including a chamber having a movable wall, means for continuously supplying plastic material under pressure to said chamber, a mold, means for moving said mold intermittently into and out of communication with said chamber and intermittently into and out of discharging position, a piston in said mold, a source of fluid pressure, means for applying said fluid pressure to said movable wall and to said piston, a valve for controlling the application of said fluid pressure to said piston, and operative connections between said mold and said valve for rendering the operation of the valve dependent upon the position of the mold.

21. The method of producing molded units of plastic material which includes continuously delivering the plastic material under pressure to a chamber of variable capacity and maintaining the material in the chamber under a predetermined substantially constant pressure, intermittently moving a mold into and out of communication with said chamber and into and out of discharging position whereby the volume of material in said chamber fluctuates, and controlling the frequency of cyclic movements of said mold to maintain the volumetric content of material in said chamber within predetermined limits.

22. The method of forming units of readily flowable substantially non-compressible material which includes continuously supplying the material under pressure to a chamber of variable capacity, intermittently delivering portions of predetermined volume from said chamber to a means for forming the material into successive units of predetermined size and shape, applying fluid pressure to the material in said chamber to maintain the pressure on said material substantially constant, and intermittently applying fluid pressure to the material delivered from said chamber to resist but permit such delivery and to effect the discharge of said units from the forming means.

BRUCE DE HAVEN MILLER.